(12) United States Patent
Pérez et al.

(10) Patent No.: US 9,826,411 B2
(45) Date of Patent: Nov. 21, 2017

(54) METHOD AND NETWORK SYSTEM FOR SUPPORTING RADIO ACCESS NETWORK SHARING

(71) Applicant: NEC Europe Ltd., Heidelberg (DE)

(72) Inventors: Xavier Costa Pérez, Heidelberg (DE); Joerg Swetina, Schriesheim (DE)

(73) Assignee: NEC CORPORATION, Tokyo (JP)

(*) Notice: Subject to any disclaimer, the term of this patent is extended or adjusted under 35 U.S.C. 154(b) by 213 days.

(21) Appl. No.: 14/435,457

(22) PCT Filed: Oct. 15, 2013

(86) PCT No.: PCT/EP2013/071543
§ 371 (c)(1),
(2) Date: Apr. 14, 2015

(87) PCT Pub. No.: WO2014/060424
PCT Pub. Date: Apr. 24, 2014

(65) Prior Publication Data
US 2015/0271681 A1    Sep. 24, 2015

(30) Foreign Application Priority Data

Oct. 15, 2012 (EP) .................................. 12188477

(51) Int. Cl.
*H04W 16/14* (2009.01)
*H04W 36/22* (2009.01)
(Continued)

(52) U.S. Cl.
CPC ........... *H04W 16/14* (2013.01); *H04W 28/08* (2013.01); *H04W 36/22* (2013.01);
(Continued)

(58) Field of Classification Search
CPC . H04W 16/14; H04W 28/08; H04W 72/0486; H04W 36/22; H04W 84/042; H04W 24/02
(Continued)

(56) References Cited

U.S. PATENT DOCUMENTS 6,195,362 B1    2/2001  Darcie et al.
8,201,205 B2 *  6/2012  Boucher .............. H04L 12/2801
                                                        370/229

(Continued)

FOREIGN PATENT DOCUMENTS

EP           1443790 A1   8/2004
WO   WO 2004004398 A1    1/2004
WO   WO 2009071431 A1    6/2009

OTHER PUBLICATIONS $3^{rd}$ Generation Partnership Project; Technical Specification Group Services and System Aspects; Service aspects and requirements for network sharing (Release 10), 3GPP TR 22.951, No. V10.0.0, Apr. 8, 2011, pp. 1-19, XP050477466.

(Continued)

*Primary Examiner* — Christine Ng
(74) *Attorney, Agent, or Firm* — Leydig, Voit & Mayer, Ltd.

(57) ABSTRACT

A method for supporting radio access network sharing is usable in connection with a hosting RAN (radio access network) provided by a hosting RAN provider. The hosting RAN includes one or more cells that are served by radio access network resources of the hosting RAN. At least one participating operator uses allocated shared radio access network resources of the hosting RAN provided by the hosting RAN provider under a sharing agreement. A controlling entity supervises shared radio access network resource utilization of the participating operator in the cells of the hosting RAN.

25 Claims, 2 Drawing Sheets

(51) Int. Cl.
  *H04W 28/08*  (2009.01)
  *H04W 72/04*  (2009.01)
  *H04W 24/02*  (2009.01)
  *H04W 84/04*  (2009.01)

(52) U.S. Cl.
  CPC ........ *H04W 72/0486* (2013.01); *H04W 24/02* (2013.01); *H04W 84/042* (2013.01)

(58) Field of Classification Search
  USPC .......................... 370/235, 236, 252, 328, 338
  See application file for complete search history.

(56) References Cited

U.S. PATENT DOCUMENTS

| | | | |
|---|---|---|---|
| 2001/0012778 A1 | 8/2001 | Eriksson et al. | |
| 2006/0056373 A1* | 3/2006 | Legg ................. | H04W 72/1247 370/341 |
| 2007/0281695 A1* | 12/2007 | Lohr ................. | H04W 72/1278 455/436 |
| 2008/0279139 A1* | 11/2008 | Beziot ................. | H04W 28/24 370/329 |
| 2011/0124332 A1 | 5/2011 | Zhang et al. | |
| 2013/0044694 A1* | 2/2013 | Aguirre ................. | H04W 28/16 370/329 |
| 2013/0225181 A1* | 8/2013 | Radulescu ............ | H04W 36/22 455/442 |
| 2013/0301539 A1* | 11/2013 | Aguirre ................. | H04W 16/00 370/329 |

OTHER PUBLICATIONS

3$^{rd}$ Generation Partnership Project; Technical Specification Group SA; Study on RAN Sharing Enhancements (Release 12), 3GPP TR 22.852, No. V0.3.0, Aug. 2012, pp. 1-22.

3$^{rd}$ Generation Partnership Project; Technical Specification Group Services and System Aspects; Network Sharing; Architecture and functional description (Release 11), 3GPP TS 23.251, No. V11.0.0, Sep. 2011, pp. 1-28.

ETSI TR 122 951 V6.1.0, Digital cellular telecommunications system (Phase 2+); Universal Mobile Telecommunications System (UMTS); Service aspects and requirements for network sharing (3GPP TR 22.951 version 6.1.0 Release 6), Mar. 2003, pp. 1-21.

* cited by examiner

METHOD AND NETWORK SYSTEM FOR SUPPORTING RADIO ACCESS NETWORK SHARING

CROSS-REFERENCE TO PRIOR APPLICATIONS

This application is a U.S. National Phase application under 35 U.S.C. §371 of International Application No. PCT/EP2013/071543, filed on Oct. 15, 2013, and claims benefit to European Patent Application No. EP 12188477.9, filed on Oct. 15, 2012. The International Application was published in English on Apr. 24, 2014 as WO 2014/060424 under PCT Article 21(2).

FIELD

The present invention relates to a method for supporting radio access network sharing, wherein a radio access network (RAN) —hosting RAN —is provided by a radio access network provider —hosting RAN provider —, wherein said hosting RAN includes one or more cells that are served by radio access network resources, preferably E-UTRAN (Evolved Universal Terrestrial Radio Access Network) resources, of said hosting RAN, wherein at least one operator —participating operator —uses allocated shared radio access network resources of said hosting RAN provided by said hosting RAN provider under a sharing agreement.

Furthermore, the present invention relates to a network system for supporting radio access network sharing, wherein the network system comprises radio access network resources, preferably E-UTRAN (Evolved Universal Terrestrial Radio Access Network) resources, for serving one or more cells, wherein a part of said radio access network resources are used as shared radio access network resources by one or more operators —participating operators —under a sharing agreement.

BACKGROUND

In recent years the capacity demand of mobile data traffic has increased considerably. To this extent, cellular network sharing is a key building block for virtualizing mobile networks in order to handle the explosive capacity demand of the mobile traffic and to reduce the CAPEX (Capital Expenditure) and OPEX (Operational Expenditure) burden faced by operators to handle this demand.

3GPP ($3^{rd}$ Generation Partnership Project) has recognized the importance of supporting network sharing since 3*GPP TR 22.951: Technical Specification Group Services and System Aspects; Service aspects and requirements for network sharing* (Release 6), March 2003 and defined a set of architectural requirements and technical specifications which have been updated until 3*GPP TS 22.951: Technical Specification Group Services and System Aspects; Service aspects and requirements for network sharing* (Release 10), March 2011 and 3*GPP TS 23.251: Technical Specification Group Services and System Aspects; Service aspects and requirements for network sharing* (Release 11), September 2011 respectively.

The standardized network sharing functionality of recent times has been sufficient to cover mobile operators' basic requirements in the past. However, as operators look for new ways to reduce costs due to their increasing financial investment burden, new business models for operators and infrastructure owners are emerging, calling for more flexibility and to extend existing standardized network sharing functionality.

The 3GPP RAN Sharing Enhancements (RSE) Study Item of the System Architecture Working Group 1 (SA1) is defining new scenarios in which multiple operators may share radio access network resources, which is described in 3*GPP TR 22.852, "Study on RAN Sharing Enhancements", Release* 14, *August* 2012. The RSE Study Item creates potential requirements that complement existing 3GPP system capabilities for sharing common radio access network resources. In this context of radio access network sharing 3GPP TR 22.852 establishes the following definitions:

- hosting RAN: radio access network resources, in particular E-UTRAN resources, provided by a hosting RAN provider for use by a participating operator;
- hosting RAN provider: A provider of a hosting RAN;
- participating operator: operator that uses allocated shared radio access network resources provided by a Hosting RAN provider under agreement;
- requesting operator: operator that requests the use of unallocated shared radio access network resources provided by a hosting RAN provider under agreement.

Generally, radio access network sharing may make use of the concept of resource pooling which is used in different application areas. For instance, it is referred to Wischik et al. "*The resource pooling principle*", *ACM SIGCOMM Computer Communication Review, Volume* 38, *Issue* 5, *Pages* 47-52, *October* 2008 or the resource pooling system and method in communication systems described in U.S. Pat. No. 6,195,362 B1.

Furthermore, it is exemplarily referred to the references US 2011/0124332 A1 and US 2001/0012778 A1 which describe handover mechanism for regular load balancing purposes.

However, the radio access network resources of mobile networks are consumed by mobile terminals that are subject to constraints such as Quality of Service (QoS) requirements, economic limits, etc. Furthermore, in mobile networks there are side-conditions such as independent and unpredictable movement of mobile users, radio signal level changes, etc. Therefore, there is a need for improved adaptations and further developments in order to satisfy and overcome the characteristics of mobile networks.

SUMMARY

A method for supporting radio access network sharing is usable in connection with a hosting RAN (radio access network) provided by a hosting RAN provider. The hosting RAN includes one or more cells that are served by radio access network resources of the hosting RAN. At least one participating operator uses allocated shared radio access network resources of the hosting RAN provided by the hosting RAN provider under a sharing agreement. A controlling entity supervises shared radio access network resource utilization of the participating operator in the cells of the hosting RAN.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1:
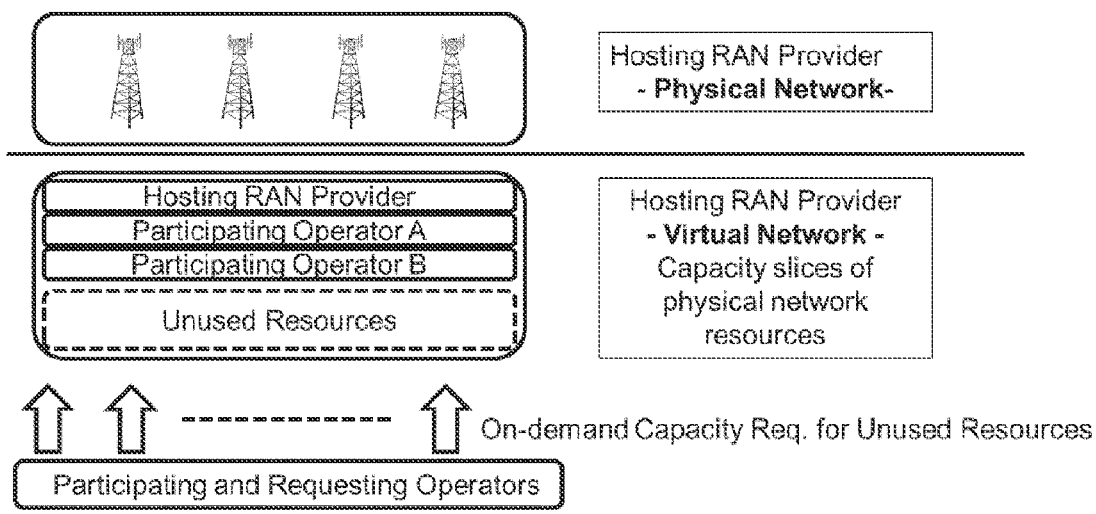
FIG. 1 shows a schematic view illustrating an application scenario for an embodiment of a method or a network system according to an embodiment of the present invention.

In an embodiment, the present invention provides a method and a network system for supporting radio access network sharing of the initially described type in such a way that, by employing mechanisms that are readily to implement, the radio access network sharing is improved, e.g. with regard to an efficient sharing and/or with regard to a flexible allocation of the radio access network resources.

In an embodiment, the present invention provides wherein a controlling entity is provided, wherein said controlling entity supervises shared radio access network resource utilization of said participating operator in the cells of said hosting RAN.

Furthermore, in an embodiment, the present invention provides a network system, wherein the network system further comprises a controlling entity, wherein said controlling entity is configured to supervise the shared radio access network resource utilization of said participating operators in the cells.

According to an embodiment of the invention, it has been recognized that the effect of radio access network sharing can be significantly enhanced by performing a monitoring and controlling of the network resources being used per participating operator in the cells of the shared radio access network which may be designated as hosting RAN. Specifically, the hosting RAN provides allocated shared radio access network resources for being used by participating operators. According to the present invention a controlling entity is introduced as controller for the radio access network sharing utilization in the hosting RAN. The controlling entity supervises the shared radio access network resource utilization of the participating operators in the cells of said hosting RAN in order to keep and/or enforce the agreements that are made in connection with the sharing agreement between the hosting RAN provider and the one or more participating operators.

Thus, the method and the network system according to the embodiments of the present invention improve the utilization of shared radio access network resources. Specifically, the embodiments of the present invention enables an efficient sharing and a flexible allocation of the radio access network resources. Exemplarily, it is noted that the radio access network resources may be resources of the E-UTRAN (Evolved Universal Terrestrial Radio Access Network) which is constituted by the network of E-UTRA base stations.

According to an embodiment of the invention, it has been further recognized that, in the embodiments of the present invention, the radio access network resources are to be understood in a broad sense. In particular, sharing of radio access network resources may refer to the sharing of radio access network assets. For example, the operators may share only cell sites. However, for instance, the sharing of radio access network resources may also include the sharing of transport infrastructure, radio spectrum and baseband processing resources.

According to a preferred embodiment, it may be provided that the supervising performed by said controlling entity includes collecting information about the participating operator's radio access network resource utilization per cell in consideration of the sharing agreement and/or in consideration of the total radio access network resource utilization per cell. To this extent, the total radio access network resource utilization covers the utilization of resources that are altogether used in the cell, i.e. by the hosting RAN provider and the one or more participating operators.

According to a further preferred embodiment, the controlling entity may evaluate the status of the radio access network resource utilization of the participating operator per cell against the sharing agreement that is arranged between the hosting RAN provider and the participating operator and/or against one or more predefined sharing policies that are arranged between the hosting RAN provider and the participating operator.

According to a further preferred embodiment, the controlling entity may trigger a corrective action in case one or more cells of the hosting RAN fulfill one or more predetermined conditions based on the sharing agreement and/or a predefined sharing policy. Thus, it may be provided that in case one or multiple cells of the hosting RAN fulfill conditions to initiate a corrective action based on the radio access network sharing policy that is agreed between the hosting RAN provider and the participating operator, then the controlling entity should take adequate measures as defined by the hosting RAN provider and/or the participating operators involved.

According to a further preferred embodiment, the sharing policy may include that the corrective action is triggered when the radio access network resource utilization of the participating operator in a cell of the hosting RAN is above a predefined, preferably configurable, threshold. The utilization of the participating operator represents the utilization of radio access network resources that are used by the participating operator in the cell. Thus, a predetermined condition is specified for initiating a corrective action. Furthermore, the threshold may represent a capacity share arranged in connection with the sharing agreement.

Advantageously, according to a further preferred embodiment, the threshold may include a percentage of capacity that is agreed in connection with the sharing agreement and/or an absolute amount of bandwidth.

According to a further preferred embodiment, the sharing policy may include that the corrective action is triggered by said controlling entity only in case that the total radio access network resource utilization of the cell exceeds a predefined threshold.

According to a further preferred embodiment, the sharing policy may include triggering the corrective action when an overall radio access network resource utilization of the participating operator within the hosting RAN is above a capacity share according to the sharing agreement. The overall radio access network utilization indicates a multi-cell view approach. More specifically, the corrective action may be triggered by the controlling entity in case that the overall utilization of radio access network resources used by the participating operator with regard to all cells of the hosting RAN is exceeding a capacity share according to the sharing agreement.

According to a further preferred embodiment, the sharing policy includes that the participating operator is allowed to go above the capacity share as pre-agreed in connection with the sharing agreement in one or more cells of the hosting RAN, i.e. without triggering the corrective action, while being below the capacity share in other cells of the hosting RAN as long as the overall radio access network resource utilization of the participating operator within the hosting RAN is below the capacity share according to the sharing agreement. Thus, an effective and flexible sharing policy is achieved.

According to a further preferred embodiment, the sharing policy may include that the corrective action is triggered by the controlling entity per cell of the hosting RAN when the overall radio access network resource utilization of the hosting RAN exceeds a predefined, preferably configurable, maximum global utilization threshold. To this extent, the global utilization threshold is globally applied to each cell of the hosting RAN.

According to a further preferred embodiment, the sharing policy includes triggering the corrective action dependent on economic reasons. Thus, a participating operator could decide to reduce or increase its traffic from specific cells with a shared hosting RAN based on differentiated utilization fees. The corrective action could increase or decrease the number of mobile users and/or mobile data traffic of a participating operator with a shared hosting RAN as desired.

It is to be noted that additional sharing policies may be defined by combining one or more of the previously described preferred embodiments relating to predetermined sharing policies.

According to a further preferred embodiment, the corrective action may comprise that a part of traffic of the participating operator in one or more cells of the hosting RAN is dropped. Advantageously, for instance, this corrective action may be applicable to real-time traffic. Furthermore, dropping a part of the traffic of a specific participating operator may be applied by the hosting RAN provider and/or the participating operator per cell and has an impact on the Quality of Service (QoS) experienced by the mobile user.

According to a further preferred embodiment, the corrective action may comprise that a part of traffic of the participating operator in one or more cells of the hosting RAN is delayed. Advantageously, for instance, this corrective action may be applicable to non real-time traffic. Furthermore, delaying a part of the traffic of a specific participating operator may be applied by the hosting RAN provider and/or the participating operator per cell and has an impact on the Quality of Service (QoS) experienced by the mobile user.

According to a further preferred embodiment, the corrective action may comprise that one or more user equipments connected to a cell of the hosting RAN are shifted, i.e. in the form of a handover, to another cell within or outside of the hosting RAN. In other words the corrective action may comprise that one or more user equipments connected to a cell of the hosting RAN are handed over to another cell, i.e. by performing a handover. In this case, at first, target user equipments are identified/determined that could be forced to handover to the other cell based on radio access network sharing agreements. Based on this pool of candidate user equipments, different selection criteria may be employed to fulfill different targets for optimizing the usage of the shared radio access network, i.e. the hosting RAN, and/or for optimizing service experience of the mobile users.

Thus, according to a further preferred embodiment, the one or more user equipments that are handed over may be chosen from a previously identified/determined pool of candidate user equipments in such a way that an optimized usage of the hosting RAN and/or an optimized service experience of the mobile users using the user equipments is provided.

According to a further preferred embodiment, the one or more user equipments that are handed over may be chosen from a previously identified/determined pool of candidate user equipments in such a way that the number of handovers incurred in the hosting RAN is minimized.

According to a further preferred embodiment, the one or more user equipments that are handed over may be chosen from a previously determined pool of candidate user equipments in such a way that signaling costs incurred in the hosting RAN are minimized.

According to a further preferred embodiment, the one or more user equipments that are handed over may be chosen from a previously determined pool of candidate user equipments in such a way that the handover is sequentially enforced according to the maximum distance to the threshold per participating operator capacity share per cell.

According to a further preferred embodiment, the one or more user equipments handed over may be chosen from a previously determined pool of candidate user equipments in such a way that the handover is sequentially enforced according to the individual amount of radio access network resources used per each mobile user using a user equipment.

According to a further preferred embodiment, the one or more user equipments handed over may be chosen from a previously determined pool of candidate user equipments in such a way that the handover is enforced based on the mobility pattern of the mobile users.

According to a preferred embodiment the one or more user equipments handed over may be chosen from a previously determined pool of candidate user equipments in such a way that the handover/shifting is enforced based on the type of services used by the mobile users using user equipments.

According to a further preferred embodiment, the one or more user equipments that are handed over may be chosen from a previously determined pool of candidate user equipments in such a way that the handover is enforced based on contractual terms of the mobile users/user equipments.

According to a further preferred embodiment, the one or more user equipments that are handed over may be chosen from a previously determined pool of candidate user equipments in such a way that the handover is enforced based on the participating operator's resource utilization within the hosting RAN.

According to a further preferred embodiment, the one or more user equipments that are handed over may be chosen from a previously determined pool of candidate user equipments in such a way that the handover is enforced based on the participating operator cells utilization outside the hosting RAN.

According to a further preferred embodiment, the one or more user equipments that are handed over may be chosen from a previously determined pool of candidate user equipments in such a way that the handover is enforced based on economic terms of the sharing agreement.

It is to be noted that the previously described preferred embodiments relating to mechanisms for choosing handover user equipments, i.e. user equipments to be shifted from one cell to another cell by performing a handover, are fundamentally different from mechanisms for regular load balancing purposes due to the user equipment selection criteria, the handover triggering action and the final objective to be achieved. Therefore, regular load balancing mechanisms, such as described in US 2011/0124332 A1 or US 2001/0012778 A1, are not applicable since they neither consider the same set of information for taking actions, usually only a subset, nor the same set of corrective actions.

Advantageously, according to a further preferred embodiment, the corrective action triggered by the controlling entity is coordinated with the admission control entity of the hosting RAN, because when moving mobile users from one cell to another cell, this could have an impact on the mobile users that are already in a cell or for accepting additional mobiles users in the cell in the future.

According to a further preferred embodiment, the controlling entity may be implemented as centralized or distributed logical entity in the hosting RAN, wherein the controlling entity may include one or more physical entities taking care of specific clusters of base stations or might even be cloudified, i.e. the controlling entity may be virtualized and cloud computing paradigms may be exploited. Then, the controlling and supervising function of the controlling entity might be collocated or integrated with other mobile network management functionalities as for instance self-organizing-networking (SON) and/or admission control.

As a result, preferred embodiments of the present invention provide

- means to be able to verify that the shared network elements provide allocated radio access network resources according to the sharing agreements and/or policies;
- means to act upon overload situations considering sharing agreements and/or policies;
- means for efficiently sharing common RAN resources according to identified RAN sharing scenarios, e.g. pooling of unallocated radio resources;
- means to flexibly and dynamically allocate RAN resources on-demand at smaller timescales than the ones supported in recent years.

Thus, solutions are provided that enable a hosting RAN provider and/or participating operators to apply policies for sharing the capacity within the cells of a shared radio access network and corrective actions to enforce the fulfillment of the radio access network sharing agreement. The present invention together with preferred embodiments may provide

- heterogeneous distribution of user equipments from participating operator with the shared hosting RAN cells,
- different hosting RAN and participating operator policies for network sharing,
- new revenue sources for the operator of the hosting RAN, i.e. the hosting RAN provider, and/or
- CAPEX and OPEX savings for the participating operators.

FIG. 1 shows an application scenario for an embodiment of a method or network system of the present invention. From a physical point of view, a hosting RAN provider as mobile operator provides a physical network in order to supply mobile users in one or more cells with radio access network resources. From a virtualized point of view, the operator functioning as hosting RAN provider provides and/or allocates a part of its physical unused network resources for being employed by other operators, e.g. the participating operators A and B depicted in FIG. 1. Thus, the participating operators A and B may make use of the resources of the hosting RAN in order to handle the capacity demands of their own mobile users. To this extent, the hosting RAN provider provides a virtual network with capacity slices of physical network resources that may be consumed by participating operators and requesting operators, which need additional network resources in order to satisfy their traffic demands. For that purpose, the requesting operators ask the hosting RAN provider for unused network resources by means of on-demand capacity requests.

The participating operators A and B of FIG. 1 use allocated shared radio access network resources provided by the hosting RAN provider under a sharing agreement. The hosting RAN of the hosting RAN provider includes a controlling entity that supervises the shared radio access network resource utilization of the participating operators A and B in the cells of the hosting RAN in order to enable an efficient RAN resource utilization in the hosting RAN.

Figure 2:
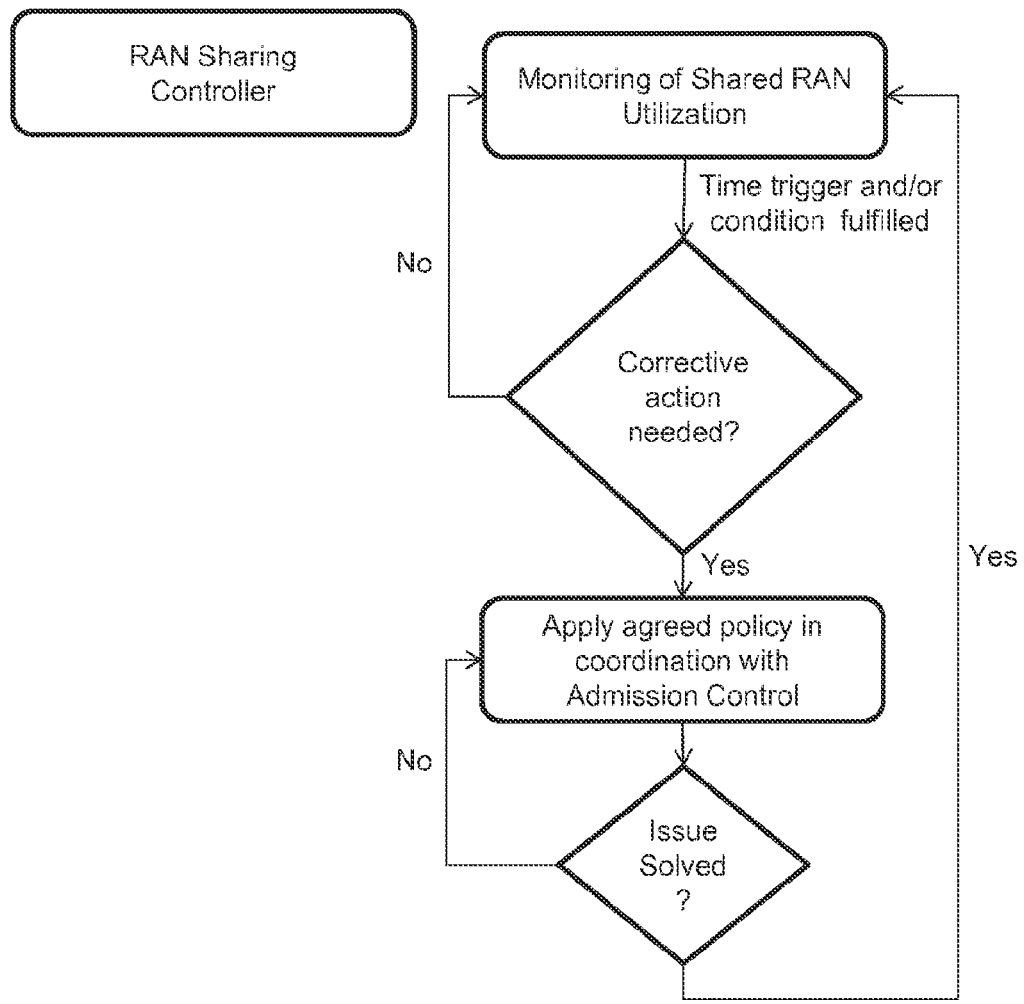
FIG. 2 shows a flowchart illustrating the steps of an embodiment of a method according to an embodiment of the present invention.

FIG. 2 shows a flowchart illustrating the steps of an embodiment of a method according to the present invention.

Specifically, FIG. 2 describes the functionality of a RAN sharing controller as controlling entity that is included in a hosting RAN according to an embodiment of the present invention. By the step of monitoring of shared RAN utilization the RAN sharing controller collects information regarding the participating operators' radio resource utilization per cell according to the RAN sharing service level agreements and information about the total utilization per cell.

Dependent on a time trigger and/or dependent on a fulfilled condition, the RAN sharing controller analyses whether a corrective action is needed. If not, the RAN sharing controller continues with monitoring of shared radio access network utilization. In case that a corrective action is needed the RAN sharing controller triggers the corrective action in the radio access network, i.e. if one or multiple cells fulfill the conditions to initiate the corrective action based on the radio access network sharing agreement and policy as agreed, then the RAN sharing controller takes adequate measures as defined by the Hosting RAN provider and/or the participating operators involved.

In case that the issue is solved the RAN sharing controller of FIG. 2 returns to the step of monitoring the shared radio access network utilization. In case the issue is not solved the RAN sharing controller continues with the corrective action.

Many modifications and other embodiments of the invention set forth herein will come to mind the one skilled in the art to which the invention pertains having the benefit of the teachings presented in the foregoing description and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for supporting radio access network sharing, wherein a hosting RAN (radio access network) is provided by a hosting RAN provider, the method comprising:
serving, by radio access network resources of the hosting RAN, one or more cells of the hosting RAN,
using, by at least one participating operator, allocated shared radio access network resources of the hosting RAN provided by the hosting RAN provider under a sharing agreement, and
supervising, by a controller, shared radio access network resource utilization of the participating operator in the cells of the hosting RAN,
wherein the controller triggers a corrective action based on one or more cells of the hosting RAN fulfilling one or more predetermined conditions based on a predefined sharing policy,
wherein the predefined sharing policy includes triggering the corrective action based on an overall radio access network resource utilization of the participating operator within the hosting RAN being above a capacity share according to the sharing agreement, and
wherein the predefined sharing policy provides that the participating operator is allowed to exceed the capacity share as pre-agreed according to the sharing agreement in one or more cells of the hosting RAN while being below the capacity share in other cells of the hosting RAN in such a way that the overall radio access network resource utilization of the participating operator within the hosting RAN is below the capacity share according to the sharing agreement.

2. The method according to claim 1, wherein the supervising performed by the controller includes collecting information about the participating operator's radio access network resource utilization per cell based on at least one of the sharing agreement or a total radio access network resource utilization per cell.

3. The method according to claim 1, wherein the controller evaluates the status of the radio access network resource utilization of the participating operator per cell based on at least one of the sharing agreement or one or more predefined sharing policies arranged between the hosting RAN provider and the participating operator.

4. The method according to claim 1, wherein the predefined sharing policy includes triggering the corrective action based on the radio access network resource utilization of the participating operator in a cell of the hosting RAN being above a predefined threshold.

5. The method according to claim 4, wherein the predefined threshold includes a percentage of capacity that is agreed in connection with at least one of the sharing agreement or an absolute amount of bandwidth.

6. The method according to claim 1, wherein the predefined sharing policy includes triggering the corrective action based on the total radio access network resource utilization of the cell exceeding a predefined threshold.

7. The method according to claim 1, wherein the predefined sharing policy includes triggering the corrective action based on the overall radio access network resource utilization in the hosting RAN exceeding a predefined maximum global utilization threshold.

8. The method according to claim 1, wherein the predefined sharing policy includes triggering the corrective action based on economic reasons.

9. The method according to claim 1, wherein the corrective action comprises dropping a part of traffic of the participating operator in one or more cells of the hosting RAN.

10. The method according to claim 1, wherein the corrective action comprises delaying a part of traffic of the participating operator in one or more cells of the hosting RAN.

11. The method according to claim 1, wherein the corrective action comprises handing over of one or more user equipments from a cell of the hosting RAN to another cell within or outside of the hosting RAN.

12. The method according to claim 11, wherein the one or more user equipments that are handed over are chosen from a previously identified pool of candidate user equipments to achieve at least one of an optimized usage of the hosting RAN or an optimized service experience of mobile users.

13. The method according to claim 11, wherein the one or more user equipments that are handed over are chosen from a previously identified pool of candidate user equipments such that a number of handovers incurred in the hosting RAN is minimized.

14. The method according to claim 11, wherein the one or more user equipments that are handed aver are chosen from a previously identified pool of candidate user equipments such that signaling costs incurred in the hosting RAN are minimized.

15. The method according to claim 11, wherein the one or more user equipments that are handed over are chosen from a previously identified pool of candidate user equipments such that the handover is sequentially enforced according to a maximum distance to the threshold per participating operator capacity share per cell.

16. The method according to claim 11, wherein the one or more user equipments that are handed over are chosen from a previously identified pool of candidate user equipments such that the handover is sequentially enforced according to an individual amount of radio access network resources used per each mobile user.

17. The method according to claim 11, wherein the or more user equipments that are handed over are chosen from a previously identified pool of candidate user equipments such that the handover is enforced based on a mobility pattern of mobile users.

18. The method according to claim 11, wherein the one or more user equipments that are handed over are chosen from a previously identified pool of candidate user equipments such that the handover is enforced based on a type of services used by mobile users.

19. The method according to claim 11, wherein the one or more user equipments that are handed over are chosen from a previously identified pool of candidate user equipments such that the handover is enforced based on contractual terms mobile users.

20. The method according to claim 11, wherein the one or more user equipments that are handed over are chosen from a previously identified pool of candidate user equipments such that the handover is enforced based on the participating operator's resource utilization within the hosting RAN.

21. The method according to claim 11, wherein the one or more user equipments that are handed over are chosen from a previously identified pool of candidate user equipments such that the handover is enforced based on a participating operator cells utilization outside the hosting RAN.

22. The method according to claim 11, wherein the one or more user equipments that are handed over are chosen from a previously identified pool of candidate user equipments such that the handover is enforced based on economic terms of the sharing agreement.

23. The method according to claim 1, wherein the corrective action triggered by the controller is coordinated with an admission control entity of the hosting RAN.

24. The method according to claim 1, wherein the controller is implemented as centralized or distributed logical entity in the hosting RAN, and wherein the controller includes one or more physical entities.

25. A network system for supporting radio access network sharing, wherein a hosting RAN (radio access network) is provided by a hosting RAN provider, the network system comprising:

radio access network resources of the hosting RAN configured to serve one or more cells of the hosting RAN, wherein a part of the radio access network resources are used as shared radio access network resources by one or more participating operators under a sharing agreement, and a controller, wherein the controller is configured to supervise the shared radio access network resource utilization of the participating operators in the cells, wherein the controller triggers a corrective action based on one or more cells of the hosting RAN fulfilling one or more predetermined conditions based on a predefined sharing policy, wherein the predefined sharing policy includes triggering the corrective action based on an overall radio access network resource utilization of the participating operator within the hosting RAN being above a capacity share according to the sharing agreement, and wherein the predefined sharing policy provides that the participating operator is allowed to exceed the capacity share as pre-agreed according to the sharing agreement in one or more cells of the hosting RAN while being below the capacity share in other cells of the hosting RAN in such a way that the overall radio access network resource utilization of the participating operator within the hosting RAN is below the capacity share according to the sharing agreement.

* * * * *